United States Patent [19]

Jackson, deceased et al.

[11] 4,220,120
[45] Sep. 2, 1980

[54] INTERNAL COMBUSTION ENGINE SYSTEM AND OPERATION

[75] Inventors: Hugh R. Jackson, deceased, late of Fullerton, Calif., by Ellin E. Jackson, executrix; Robert H. Haas, Fullerton, Calif.

[73] Assignee: Union Oil Company of California, Los Angels, Calif.

[21] Appl. No.: 425,170

[22] Filed: Dec. 14, 1973

Related U.S. Application Data

[63] Continuation of Ser. No. 128,874, Mar. 29, 1971, abandoned.

[51] Int. Cl.² ............................................. F02M 13/04
[52] U.S. Cl. ................................................... 123/3
[58] Field of Search ................... 123/127, 133, 139, 3

[56] References Cited

U.S. PATENT DOCUMENTS

| | | | |
|---|---|---|---|
| 1,559,216 | 10/1925 | Woolson | 123/127 |
| 1,576,766 | 3/1926 | Kloepper | 123/127 |
| 2,098,575 | 11/1937 | Flamini | 123/127 |
| 2,865,355 | 12/1958 | Hilton | 123/139 R |
| 2,940,435 | 6/1960 | Nemec etal. | 123/139 R |
| 3,021,681 | 2/1972 | Perry | 123/133 R |
| 3,688,755 | 9/1972 | Grayson etal. | 123/127 |

Primary Examiner—Wendell E. Burns
Attorney, Agent, or Firm—Gregory F. Wirzbicki; Dean Sandford

[57] ABSTRACT

An internal combustion engine operating method and system include provisions for on-site fuel separation, accumulation of the resultant fractions, and an automatic control of engine fuel feed composition and air-to-fuel ratio in response to factors including engine operating temperature, engine load, liquid fuel temperature and ambient conditions. These systems and methods allow dramatic improvement in engine operating performance, hydrocarbon emissions levels, full range fuel characteristics compatible with a given engine and flexibility of operation under varying conditions of load and ambient temperature.

18 Claims, 1 Drawing Figure

INTERNAL COMBUSTION ENGINE SYSTEM AND OPERATION

This is a continuation of application Ser. No. 128,874, filed Mar. 29, 1971, now abandoned.

BACKGROUND

The major classifications of internal combustion engines have several characteristics in common regarding the effect and control of factors which influence the efficiency of fuel conversion to useable heat and/or mechanical energy and attendant effects such as noxious exhaust component emissions. Exemplary of engines to which this subject pertains are reciprocating piston-type internal combustion engines including gasoline and diesel engines, rotating piston or Wankel engines, and to a lesser, although significant degree, turbo-jet engines operating on liquid turbine fuels.

Almost without exception, these various power plants, regardless of the utility to which they are applied, are expected to operate and are operated, under varying conditions of load, engine operating temperature, ambient temperature and barometric pressure. Due to the nature of these power plants, all of these variables are known to effect the efficiency of fuel conversion to mechanical energy and the attendant production of undesirable byproducts or unreacted feed constituents in the form of exhaust emissions.

For example, in the operation of a conventional spark ignition gasoline automotive engine, it is known that considerable reduction in air-to-fuel ratio, below that required for operation at design operating temperatures, is required when the engine is cold. This requirement is due to the relatively low volatility of the gasoline fuel at relatively low engine operating temperatures thus requiring the injection of higher amounts of fuel per unit standard volume of air to obtain adequate performance. An equally well-known consequence of operating at lower air-to-fuel ratios is the presence of dramatically increased amounts of unburned hydrocarbons and carbon monoxide in the engine exhaust. Engine operation resulting in the discharge of such amounts of unburned combustible materials results in further contribution to already excessive air pollution problems but also results in inefficient engine operation and attendant increased operating expense.

However, another problem of a different nature, yet still related to fuel volatility characteristics, and with which almost every motorist is familiar, is that of vapor lock occurring in systems employing liquid fuel pumps. This condition results when the fuel temperature within the pump exceeds that required to vaporize an amount of the hydrocarbon fuel sufficient to displace a significant part of the pump displacement volume. When the incipient vapor lock temperature is reached, i.e., that temperature at which vaporization within the pump first occurs, the amount of fuel transfer through the system by the pump and the outlet pressure become subject to variation and are reduced below the design specifications of the system. These consequences result in uncontrollable fuel rate fluctuations through the carburetor or other fuel induction means, e.g., fuel injectors, with attendant engine power surging. If the situation persists by the continued formation of vapor phase in the fuel pump, the pump will finally fail to convey an amount of fuel necessary to maintain engine operation resulting in total shutdown.

One solution to the problem of engine startup at relatively low temperatures is the provision of a highly volatile fuel. A fuel could be provided on which the engine could be started at moderately low temperatures without the necessity of excessive choking and attendant inefficient combustion and pollutant emissions. However, the degree of volatility of the selected fuel would depend upon the lowest anticipated engine operating temperature. This factor is, of course, subject to considerable variation depending on geographic location, seasonable factors and altitude. In face, in this age of greatly increased mobility it is quite conceivable that an automotive engine might be expected to operate throughout extremes of high and low temperature and even differences in barometric pressure occasioned by changes in altitude within a period of only a few hours. It therefore becomes apparent that solving this particular problem associated with fuel composition by providing a fuel of predetermined composition designed to meet all demands is rather impractical due to the extremes that the system might be expected to accommodate.

The modification of fuel compositions by the provisions of a greater proportion of light ends in the total fuel mixture also results in a fuel having a lower energy content on a volume basis. Consequently, if the volatility of the total fuel is increased to solve or at least reduce problems associated with operation at lower engine temperatures, such modifications are made at the expense of total power output for a given volume of fuel or, in the case of the automotive engine, shorter mileage ranges per tank of gas.

This proposed solution to the problem of low engine operating temperatures is completely inconsistent with the problems encountered with fuel vapor lock discussed above. The only reasonable solutions to the problem of fuel vaporization within the fuel pump itself are either cooling of the fuel pump and the fuel feed thereto or reducing the inherent volatility of the fuel. Cooling of the fuel system of course requires considerable expense and the consumption of power in order to attain that objective. On the other hand, reduction of fuel volatility, which would solve the problem if sufficient reduction is achieved, would only serve to magnify the problems associated with cold engine operation.

Yet another drawback to the use of lighter fuels to prevent excessive exhaust emissions on startup and other attendant problems, is that the remedy creates another ill of the same nature. Higher volatility fuels have higher vapor pressures and consequently cause greater escape of vaporized hydrocarbons from storage, during transfer and in the original fuel system itself. Particular interest has developed in this problem with regard to automotive engines as indicated by several legislative proposals and acts at the state and federal level. For example, California Assembly Bill No. 81 enacted in 1970 requires the California Air Resources Board to limit gasoline vapor pressure to 9 pounds Reid Vapor Pressure (RVP) maximum as required to reduce evaporative emissions when necessitated by seasonal and climatic conditions. The use and handling of a light volatility full range fuel would obviously not meet these requirements when imposed and would not comport with the legislative intent evidenced by this and similar enactments.

Similar problems of significant magnitude are also encountered in the operation of liquid fuel turbines and diesel engines at operating temperatures substantially below design operating temperatures. For example, upon startup, diesel engines are known to exhibit characteristics similar to those discussed above regarding spark ignition gasoline engines. One telltale sign of cold diesel operation is the emission of a bluish exhaust smoke indicating the presence of substantial amounts of hydrocarbons in the exhaust. The problem is not as severe with regard to liquid fueled turbines although differences in the efficiency of fuel consumption determined by the extent of unburned hydrocarbon emissions is readily detectable upon cold startup of such power plants. Here, again, the lack of complete fuel consumption is due primarily to the relatively slow rate of fuel vaporization upon exposure to the relatively cold combustion zones as opposed to the much higher rates of vaporization that result after the engine has reached design operating temperature.

As in the case of spark ignition gasoline engines, the problems associated with low temperature operation of diesel and turbine power plants can be minimized by the use of higher volatility fuels. However, several significant disadvantages result by the use of lighter fuels in such systems. The most significant of these problems is the substantial loss in heat energy per volume of fuel which results from the use of lower boiling fuels. This loss is particularly significant with relation to commercial diesel engines intended to operate through a widely variant range of load requirements. In other words, the use of a high energy low volatility fuel in a commercial diesel engine operating at design temperature under maximum load is a decided advantage. The use of higher volatility, lower energy fuels under such circumstances results in significant power loss and the consequent requirement for larger power plants or other compensating modifications in operating conditions.

An example of the variable fuel requirements of commercial diesel engines is posed by comparison of the operation of diesel powered trailer tractors at highway speeds or on grades as opposed to operation at relatively low speeds in populated areas. The higher energy fuels, of course, are desirable when operating under maximum load on highways and particularly on uphill grades. Such use is not particularly detrimental from the environmental standpoint due to the fact that the exhaust emissions which are higher in unburned hydrocarbons when operating on lower boiling fuels, are not emitted in congested areas. However, as the same truck passes into or through a populated area at reduced speed, power requirements are not nearly so severe so that the substitution of a higher volatility fuel would not unduly hamper engine operation. It would, however, markedly reduce the extent of exhaust emissions which is a very desirable objective in congested areas.

A problem associated primarily with the operation of turbojet engines, particularly aircraft engines, is the extensive degree of particulate or "smoke" emissions usually encountered upon take off and landing. This characteristic is usually caused by lower air-to-fuel ratios employed under certain conditions. However, the level of smoke and/or particulate emissions in these systems can be markedly reduced by use of the methods and apparatus of this invention. To accomplish this result, the engine is operated on the lighter fraction when it is desirable to reduce emissions. The requisite control of fuel selection can be accomplished either manually or automatically. Automatic control can be effected by sensing the air-to-fuel ratio or parameters related thereto, and directing flow of the light fraction to the fuel intake when that ratio is below a predetermined minimum. The heavy fraction can either be recycled to the full range fuel reservoir or accumulated and directed to the fuel intake at air-to-fuel ratios above said predetermined minimum.

A collateral problem associated with the use of higher boiling fuels such as diesel and turbine fuels stems from the accumulation of paraffinic, e.g. waxy, hydrocarbons in the fuel filter during low temperature operation, e.g. startup. Essentially all engine fuel systems employ relatively fine filters in the fuel lines upstream of the final induction means to reduce the possibility of fouling the engine or fuel inductor, e.g. carburetor. Relatively high molecular weight paraffins "condense out" on these filters causing increased pressure drop and even total shutdown. This problem, as several of the others already discussed, is most acute during low temperature operation. When design operating temperatures are approached the solubility of these paraffinic materials is increased to the point that no condensation takes place. However, the methods of this invention can be employed to minimize or even eliminate such condensation by operating the engine on a lighter fraction when a temperature indicative of the fuel temperature at the filter is below a predetermined minimum, e.g. 100° F. After this temperature is exceeded, the fuel flow can be redirected as discussed hereinafter to supply either the full range fuel or the heavy fraction recovered during separation.

Consequently, it can be seen that the demands imposed upon the operation of internal combustion engines by the varying nature of conditions under which those systems are operated necessitates the selection of a fuel which, in a manner of speaking, is the best compromise available to meet the requirements of each operating extreme without magnifying problems which might occur at other operating conditions beyond tolerable limits. Consequently it is generally the case that a fuel of a specific composition will not be the best fuel for operation at one or more conditions of ambient temperature, engine operating temperature, barometric pressure or load.

It is therefore one object of this invention to provide an improved internal combustion engine operating method and apparatus. Another object is the provision a method and apparatus for improving the operation of internal combustion engines under varied operating conditions. Another object is the provision of an improved method of apparatus for operating internal combustion engines on a relatively wide boiling range fuel of predetermined characteristics under varying conditions of ambient temperature, load and engine operating temperature. Yet another object of this invention is the provision of improved method and apparatus for the operation of gasoline and diesel engines under extreme conditions of ambient temperature, operating load or engine operating temperature on a hydrocarbon fuel designed for optimum utilization within a narrower range of operating conditions. Yet another object of this invention is the provision of an apparatus for the reduction of air pollutant emissions attendant internal combustion engine operations. Still another object is the reduction of pollutant emissions from internal combustion engines without deleteriously effecting engine operating characteristics. Still another object is to enable the operation of internal combustion engines on a wider boiling range fuel mixture. A further object of this invention is the provision of a method and apparatus for operating internal combustion engines throughout a range of operating conditions of ambient temperature, engine operating load temperature while reducing requisite variations in air-to-fuel ratio. A further object is the reduction of vapor lock tendencies in liquid fuelled internal combustion engines.

In accordance with one embodiment of this invention the operation of an internal combustion engine employing a full range vaporizable liquid fuel mixture includes the steps of separating a portion of the full range fuel into a lower boiling fraction and a higher boiling fraction and operating the engine, at least in part, on the lighter fraction when the operating temperature of the engine is below a predetermined minimum. The characteristics of the lighter boiling fraction, e.g. boiling point range and the temperature level at which the lighter fraction is passed as fuel to the engine, are determined to enable efficient, smooth engine operation at relatively low temperatures such as those encountered upon startup without the necessity of substantially decreasing the air-to-fuel ratio thereby avoiding higher exhaust and carbon monoxide emission levels.

In accordance with another embodiment, the heavy fraction is at least partially accumulated during the operation of the engine and passed to the engine as fuel through a liquid fuel pump when conditions such as temperature and pressure indicative of the tendency of the fuel to vaporize within the fuel pump indicate that incipient vaporization or vapor lock conditions are being approached or have been exceeded. This method of operation serves to prevent or at least reduce the vapor locking tendencies observed at higher operating or ambient temperatures or under reduced operating pressures. Vapor lock problems associated with pressure variation are usually encountered upon changes in external pressure, i.e., barometric pressure occasioned by significant changes in elevation.

In accordance with another embodiment, the light and heavy fractions are at least partially accumulated during engine operation above the predetermined minimum temperature. These constituents are then employed either alone or in admixture with other fuel components under conditions of light or heavy load to satisfy power requirements or reduce hydrocarbon and carbon monoxide emissions.

In another embodiment an internal combustion engine is operated on a relatively high boiling hydrocarbon fuel containing an amount of lower boiling constituents insufficient to enable utilization of the full range fuel in conventional systems under all extremes of operating conditions by separating at least a portion of the fuel into a lighter fraction at least a portion of which is accumulated and passed to the engine as fuel when a temperature indicative of the operating temperature of the engine is below a predetermined minimum. This system enables the effective use of fuels which could not otherwise be employed in a given system. For example, in this embodiment, the isolated lower boiling fraction could be employed in addition to variation in air-to-fuel ratio at relatively low temperatures to afford smooth engine operation even under load without stalling or skipping.

The several concepts of this invention can be better understood by reference to the drawing which is a schematic illustration of one embodiment of this invention combining several of the concepts disclosed herein.

Figure 1:
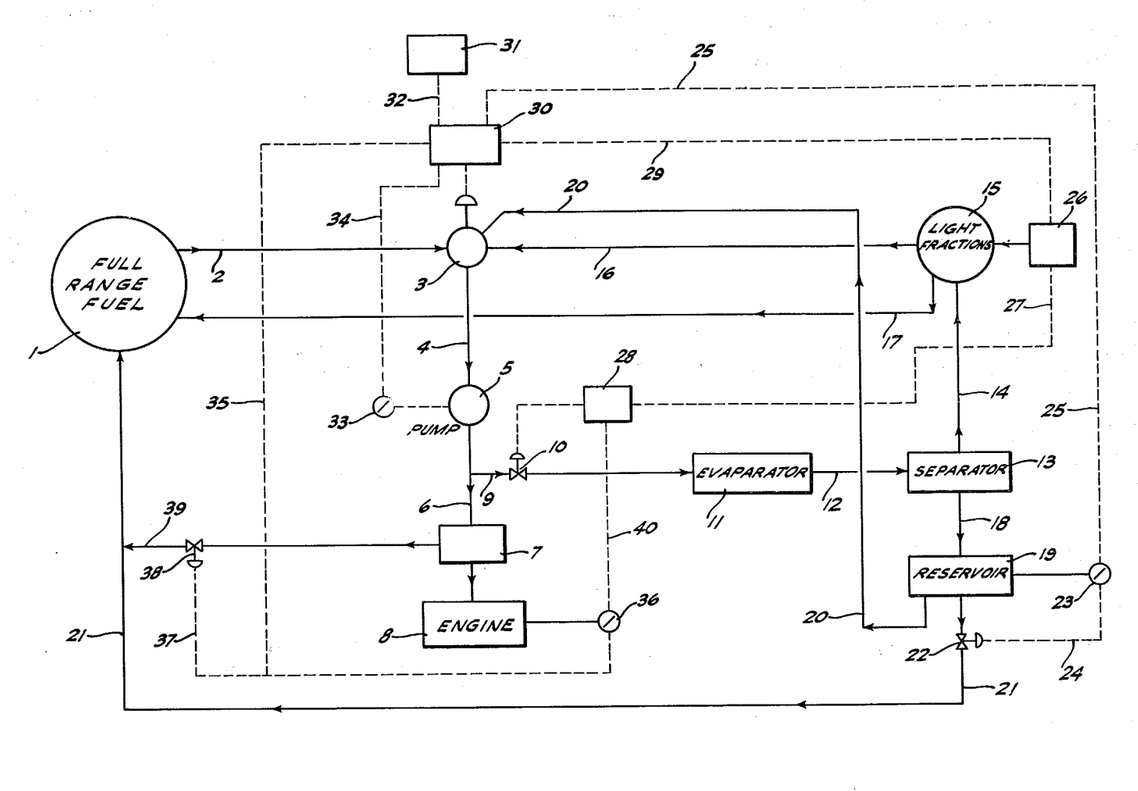

Referring now to the drawing, a full range liquid fuel is supplied to the system from reservoir 1 illustrated in this figure as a fuel tank. However, it should be understood that the full range fuel could be supplied directly to the system by conduit from a remote source in the case of a fixed engine installation. The full range fuel will of course vary depending upon the characteristics of the engine. For example, spark ignition gasoline engines envisioned within the concepts of this invention, generally employ fuels boiling primarily between 50° 500° F., usually between about 80° and 450° F. When a primary objective in operation of the installation is the prevention of air pollutant emissions when operating under extreme conditions such as the relatively low temperatures encountered during startup, it is also preferable that the full range fuel contain at least about 10 volume percent of hydrocarbon constituents boiling below about 200° F., preferably below about 150° F. In contrast, the fuels usually employed in the operation of diesel engines usually boil between about 150° and 600° F. Similar boiling range fuels are employed in the operation of turbojet or turboprop engines. However, larger diesel engines such as those employed in diesel locomotives, are designed to accommodate even heavier fuels containing constituents boiling up to about 700° F. In each situation it is desirable that the selected fuel should contain at least about 10 volume-percent of constituents boiling within a range on which the engine can be operated at the lowest anticipated operating temperature without excessive variation in air-to-fuel ratio. The boiling point ranges of these fuels will usually be in excess of about 100° F., preferably in excess of about 200° F.

In this embodiment, the full range fuel is passed from reservoir 1 via conduit 2 to a four-way valve 3, conduit 4, liquid fuel pump 5, line 6, and fuel induction means such as carburetor 7 to the engine 8. This alignment of fuel passage from the fuel source to the engine is established when the engine operating conditions are such as to enable efficient operation on the full range fuel. The controlling variable in this regard is usually engine operating temperature. However, operating load is also a factor in some situations as will be discussed later. A portion of the full range fuel leaving liquid fuel pump 5 is passed via line 9 and valve 10 to evaporator 11. The evaporator is operated at a temperature sufficient to produce a vapor phase comprising the desired lower boiling fraction. This fraction usually constitutes less than about 50 volume-percent and preferably less than 30 volume-percent of the full range feed. As a general rule, the 50% boiling point of the lighter boiling fraction will be at least about 50° F. below the 50 volume-percent boiling point of the full range feed. This usually corresponds to a maximum boiling point below 300° F., preferably below 250° F. The exact definition of the maximum boiling point will of course depend upon the nature of the engine employed, e.g., gasoline spark ignition, diesel, etc., and the extremes of operating conditions anticipated. The most significant consideration in this latter regard is the minimum temperature at which the engine will be operated. That limit in turn is usually primarily a function of geographical and seasonal conditions.

The combination of liquid and vapor phase thus produced in evaporator 11 is passed by way of conduit 12 to separator 13. Any one of numerous available forms of apparatus effective for separating vapor and liquid phases can be employed for this purpose. The temperature in separator 13 should be approximately the same as that existing in evaporator 11 in order to maintain the desired degree of separation. However, any means by which the full range fuel can be separated into the desired lighter and heavier fractions can be employed within the concept of this invention. For example, the evaporator and separator functions can be performed in a unitary apparatus rather than by the two part apparatus illustrated in the figure.

The lower boiling fraction is removed from the separator by way of conduit 14 and is passed either in vapor phase or as liquid phase following condensation to the light fraction accumulator 15 wherein at least a portion of the lower boiling fraction is accumulated during operation of the system. Provision can be made for condensing the vapor phase lighter fraction recovered from separator 13 either within accumulator 15 or prior to introduction of that fraction to the accumulator. In another embodiment, provision can also be made for passing the vaporous or condensed lighter fraction directly to the full range fuel reservoir 1. In the alternative the condensed lighter fraction can be passed directly to the fuel induction means such as carburetor 7. In either event, the excess portion of the lower boiling fraction can be returned to the full range fuel reservoir 1 by way of overflow line 17 if desired. This procedure is required when the separator system is operated continuously during the operation of the engine without complete depletion of the lower boiling fraction at a rate equivalent to the rate at which it is produced. However, in the embodiment illustrated in the drawing, provision is made for sensing the amount of lighter fraction accumulated in reservoir 15 by means of liquid level detector 26. The signal developed by detector 26 can be passed by control circuit 27 to controller 28 and valve 10 to discontinue flow of the full range fuel to the evaporator and separator when the level of accumulated fraction in reservoir 15 reaches a predetermined level.

The lighter fraction is then passed as required by way of line 16, valve 3, and lines 4 and 6 to the power plant 8.

The heavier fraction recovered from the separator 13 is passed by way of line 18 to reservoir 19 having an optional liquid level indicator 23 and off-on control valve 22 for controlling the recycle of the heavy fraction by way of line 21 to the full range fuel reservoir 1. In an alternative embodiment, the level indicator 23 and control valve 22 can be replaced by a simple overlow recycle system if desired. Heavy fraction reservoir 19 can even by eliminated altogether with direct recycle of the heavy fraction to reservoir 1 when it is not desirable to accumulate at least a portion of the heavy fraction. However, in this embodiment means is provided for passing the accumulated heavy fraction by way of pipe 20, multidirectional control valve 3 and line 4 to pump 5 when desired.

In the illustrated case, the power plant 8 is a spark ignition gasoline engine to which the fuel is introduced via a carburetor 7. The great majority of carburetors employed in such systems are provided with fuel reservoir or bowls within the carburetor itself that are continuously refilled during operation. However, it may be desirable to remove the fuel retained in the carburetor reservoir after shutdown and prior to initiation of the next startup if the fuel retained in the reservoir is either the full range fuel, the heavy fraction or a combination thereof. Consequently, in this embodiment means is provided for passing the fuel retained in the carburetor bowl via valve 38 and lines 39 and 21 to the fuel reservoir 1. Several alternatives are available in the operation of this recycle system. For example, the residual fuel retained in the carburetor float chamber can be recycled automatically after shutdown. On the other hand, as illustrated in this embodiment, recycle of the retained fraction can be controlled as a function of engine temperature. Temperature sensing means 36 detects a temperature indicative of the engine temperature and passes that signal through control circuit 37 to valve 38. When the engine temperature is below a predetermined minimum, control valve 38 is opened allowing recycle of the heavier fraction retained in carburetor 7 to reservoir 1. However, if the engine temperature exceeds that predetermined minimum such that the engine can be effectively restarted and operated on the full range fuel without significant variation in air-to-fuel ratio, control valve 38 remains closed thereby enabling direct use of the fuel retained in the carburetor bowl.

Provision is also made for controlling the flow of fuel through line 9 to evaporator 11 in response to the engine operating temperature. This control feature is accomplished by passing the temperature signal developed by detector 36 via control circuit 40 to controller 28 operating on valve 10. When the engine operating temperature is below the noted predetermined minimum such that lighter boiling fuel is passed to the engine upon startup, valve 10 is closed so as to prevent recycling of the lighter fraction through the evaporator and separator.

Another aspect includes control of flow of higher boiling fraction to the fuel pump and engine in response to the fuel temperature within fuel pump 5. This pump, usually a positive displacement liquid fuel pump, is preferably electrically operated in order to enable rapid introduction of fuel to the carburetor 7 when provision is made for dumping the carburetor bowl prior to startup at relatively low temperatures. A temperature indicative of the fuel temperature in the pump related to the incipient vapor lock temperature of the full range fuel is detected by temperature detector 33 and is passed by way of control circuit 34 to controller 30 operating on multidirectional valve 3. Controller 30 also receives signals indicative of engine operating temperature by way of control circuit 35, and signals indicative of the presence or absence of light and heavy fractions by way of circuits 29 and 25 respectively. Manual controller 31 is employed to override the signals otherwise received by controller 30 and provides for the alternative of manually controlling multidirectional valve 3 and selecting the desired fuel source accordingly.

For purposes of describing the operation of the entire system, it will be assumed that the engine is started at a temperature below the predetermined minimum. This temperature will usually be set as a function of the temperature at which the full range fuel is substantially vaporized upon introduction into the combustion chambers within the engine. In the case of most water cooled spark ignition gasoline engines this temperature corresponds to a coolant temperature of approximately 110° F. Under these circumstances, temperature indicator 36 will direct valve 38 to open thereby dumping the carburetor fuel reservoir. A similar signal passed by way of circuit 35 to controller 30 will direct multi-directional valve 3 to align conduits 16 and 4 thereby drawing lower boiling fraction from reservoir 15 while at the same time blocking fuel flow through conduits 2 and 20 from reservoirs 1 and 19 respectively. However, provision can also be made for proportioning the amount of lighter fraction and full range fuel fed to the engine on startup depending on the differential between the indicated engine temperature and the predetermined set point, e.g., minimum required operating temperature. In accordance with that alternative valve 3 could be set to allow fuel to be drawn simultaneously from reservoirs 1 and 15 in accordance with the differential between the actual and predetermined minimum temperatures. However, for purposes of simplicity this embodiment will be limited to consideration of a system employing only the lighter fraction upon startup at temperatures below the prescribed minimum.

The engine operating temperature will determine the position of multi-way valve 3 unless the supply of lighter fraction in reservoir 15 is insufficient. In that event, indicator 26 will detect the absence of fluid in accumulator 15 sending a corresponding signal via circuit 29 to controller 30 and reorienting valve 3 to align conduits 2 and 4 allowing fuel to be drawn from full range reservoir 1. At temperatures below the prescribed minimum valve 10 will be closed to prevent passage of fuel through the evaporator curcuit.

After a period of engine operation sufficient to raise the engine operating temperature above the predetermined minimum, valve 3 will be reset to align conduits 2 and 4 thereby drawing fuel from the full range reservoir. In addition, valve 10 will be opened to allow passage of fuel through the evaporator and separator with attendant accumulation of light and heavy fractions in reservoirs 15 and 19 respectively.

If operation is continued under conditions of relatively high ambient or engine operating temperature such that the temperatures in fuel pump 5 approaches the incipient vapor lock temperature, a signal representative of this fact, e.g., the temperature of the fuel in pump 5, will be detected by indicator 33 and passed by way of circuit 34 to controller 30. Controller 30 will then be actuated to reset valve 3 to at least partially align fuel line 4 with line 20 from the heavy fraction reservoir thereby reducing the volatility of the fuel in pump 5. The resultant drop on fuel volatility will serve to reduce the problems associated with premature fuel vaporization. Be this procedure, efficient smooth engine operation can be effected under varying operating conditions without the necessity of substantially modifying air-to-fuel ratio. The emission of pollutants, e.g., unburned hydrocarbons, carbon monoxide and nitric oxide encountered during operation on excessively rich or lean fuel mixtures is thereby reduced.

As a general rule, this system will allow engine operation over the full range of operating conditions from startup to shutdown with less than 20% and preferably less than 10% variation in air-to-fuel ratio throughout the range of operating conditions without significant impairment of engine performance. A convenient and somewhat standardized indicia of operating performance can be obtained with the Automobile Manufacturers Association driveability test. The AMA driveability rating of a cold automotive gasoline engine operated with the systems of this invention is at least equivalent to the rating of the same engine operating on the full range fuel at otherwise identical conditions.

The AMA driveability standard test was devised by the National Automobile Manufacturers Association and was accepted by the California Air Resources Board, Sacramento, Calif., in November 1966 as a standard procedure for determining the driveability of automotive engines. The test is designed to determine the effect of a system on the operation of an automotive engine by comparing the operation of the engine in combination with the system to an identical standard engine operated in the absence of the system. Factors given particular consideration are engine starting ability throughout a range of temperatures including $-20°$ F. to $130°$ F., at altitude, and high humidity; carburetor icing resistance, hot fuel handling characteristics, choke performance under several different conditions; idle quality under all conditions; and drive quality after engine warmup. Of particular interest with regard to this concept are the qualities evaluated upon cold start and operation of the cold engine under load. Significant variables include, engine idle rpm, the smoothness of engine idle immediately after startup; and the number of stalls, backfires, hesitations, and stumbles encountered upon operating under conditions of nominal, moderate, and high load. Load conditions are determined as a function of acceleration rate for automotive engines. For purposes of this evaluation procedure, the term "stall" refers to engine shutdown. "Backfire" refers to explosions occuring either in the induction or exhaust system. "Hesitation" refers to a temporary lack of initial response, and acceleration rate and stumble connotes short, sharp reductions in acceleration rate.

The other side of the problem, encountered during operation of a warmed-up engine, is commonly referred to as vapor lock and occurs when fuel begins to vaporize in the fuel pump thereby varying and reducing the effective displacement volume of the pump. The AMA driveability procedure refers to this condition as "surging" which, briefly, is defined as a condition of leaness, e.g., unreasonably high air-to-fuel ratios, resulting in short, sharp power fluctuations which may be cyclic or random and can occur at any speed or load.

As previously indicated, an alternative embodiment of this invention takes into consideration the flexibility of fuel requirements in diesel engines operating under variant load conditions. In this embodiment, a signal indicative of the load on the engine can be employed to reset multi-directional valve 3 to provide for the use of the lighter fuel fractions under conditions of low load. Conversely the full range fuel or mixtures thereof with the heavier fraction from reservoir 19 would be employed under conditions of relatively high load. Although not shown in the drawing, the magnitude of the load on an operating diesel, e.g., a tractor-trailer, or locomotive diesel, can be determined by any one of several known methods. For example, the rate of fuel flow to diesel engine is usually determined by the fuel rack setting which varies the amount of fuel sent to the engine by the fuel pump. This rack setting, or fuel pump feed rate, is a primary indicator of engine load and can be detected and calibrated with fuel composition by the systems of this invention. This function could be achieved by sending a signal indicative of the load on the engine to controller 30 when the rack setting or fuel pump rate exceeds a predetermined minimum indicating a relatively high engine load. Controller 30 will then align either conduits 2 and/or 20 with fuel feed line 4 to provide a heavier fuel mixture to the fuel pump intake.

EXAMPLES 1 THROUGH 3

These three examples demonstrate the degree of superior preformance and anti-pollution characteristics which can be achieved by the use of the systems of this invention on internal combustion engines operating at temperatures substantially below their designed operating temperature, e.g., at conditions experienced on engine startup.

All three examples were run as comparative tests on a 1971 Buick Centurion. Exhaust emissions including hydrocarbon, carbon monoxide and $NO_x$ emissions were measured in accordance with the specifications of the 1972 Emission Control Test established by the U.S. Department of Health, Education and Welfare. Only the first three cycles of this test were used in each operation. Driveability ratings were determined in accordance with the National Automobile Manufacturers Association standard driveability procedure adopted by the California Air Resources Board in November 1966. All of these results are summarized in Table 1.

Example 1 was conducted on the Buick Centurion having a production choke setting operating on a typical gasoline fuel having a 50% boiling point of 207° F., and a 90% boiling point of 325° F. determined by ASTM standard distillation D-86 Group 4. Ambient temperature, and the temperature of the engine at startup were approximately 75° F. The driveability rating at these conditions was only 40 on a scale of 0–100 which is apparently acceptable for most drivers. During the first three cycles of the HEW emission test, the exhaust contained 37 grams of unburned hydrocarbon, 575 grams of carbon monoxide and 95 grams of oxides of nitrogen.

In Example 2, the same car was started up under the same conditions with the fuel described in Example 1, the only difference being the use of a fast-release choke on the carburetor. Driveability conditions were intolerable and were equivalent to the rating of only 03 on a scale of 0–100. The car repeatedly stalled, surged excessively and exhibited inferior sluggish acceleration. However, use of the fast release choke, i.e. increasing air-to-fuel ratio, substantially reduced pollutant emissions which amounted to 17 g of unburned hydrocarbon, 175 g of carbon monoxide and 95 g of nitrogen oxides.

In Example 3, the identical automobile was started up under identical conditions and run through the same series of tests with the fast release choke of Example 2 using a lower boiling gasoline range fuel fraction. This fuel had a 50% boiling point of 140° F. and a 90% boiling point of 220° F. The driveability rating of the vehicle under these conditions was 92 on the National Automobile Manufacturers Association driveability test which was vastly superior to the performance obtained in either of the first two examples. Similarly, exhaust emissions were dramatically reduced to levels in some respects even below those observed in Example 2. Hydrocarbon emissions amounted to only 17 g while carbon monoxide emissions were reduced to 130 g. Nitrogen oxide emissions were at a level at 100 g.

TABLE 1

| Ex. No. | Fuel Description[1] 50% bp, °F. | 90% bp, °F. | Choke | Drive-Ability | Emissions HC | CO | NO |
|---|---|---|---|---|---|---|---|
| 1 | 207 | 325 | Production | 40 | 37 | 575 | 95 |
| 2 | 207 | 325 | Fast Release | 03 | 17 | 175 | 95 |
| 3 | 140 | 220 | Fast Release | 92 | 17 | 130 | 100 |

[1]ASTM, D-86 Group 4.

From these results it is apparent that use of the system of this invention not only enables the use of a fast release choke system thereby dramatically reducing pollutant emissions even below the level obtained with an identical fast release choke with a different fuel system, but also considerably improved overall driveability.

EXAMPLES 4 AND 5

Tests conducted by the Coordinating Research Council, Inc. of New York, and presented in the Society of Automotive Engineers paper "CRC Looks at Cars, Fuels and Vapor Lock" presented in Tulsa, Okla. in November, 1965, have shown that a typical passenger car experiences vapor lock, evidenced primarily by surging during acceleration, due to over-lean air-to-fuel ratios when the fuel pump inlet temperature reaches a level sufficient to produce a 20-to-1 vapor-to-liquid ratio of the subject gasoline at atmospheric pressure. These same tests have also shown that typically—under severe driving conditions—that fuel pump inlet temperatures are about 38° F. above ambient air temperatures. Thus the temperature at which a gasoline fuel forms a vapor-to-liquid ratio of 20/1, minus 38° F., gives a reasonable approximation of the ambient tempperature for trouble-free operation without vapor lock.

TABLE 2

| Example No. | Fuel Description[2] 10% bp,°F. | 30% bp,°F. | Temp. for[1] 20/1-V/L°F. | Safe Ambient Operating Temp. |
|---|---|---|---|---|
| 4 | 142 | 185 | 158 | 120 |
| 5 | 99 | 134 | 111 | 73 |

[1]Temperature required to produced a 20-to-1 vapor-to-liquid ratio at atmospheric pressure.
[2]ASTM, D-86 Group 4.

The higher boiling fuel of Example 4 did not reach a vapor-liquid ratio of 20 to 1 until the temperature was elevated to 158° F. In contrast the lower boiling fuel of Example 5 reached a 20-to-1 vapor-liquid ratio at a temperature of 111° F., 47° lower than the temperature required in Example 4. Consequently, it can be seen that the fuel mixture of Example 4 could be used in a fuel supply system to an internal combustion engine wherein the fuel pump inlet temperature was 47° higher than would be possible when operating on the fuel of Example 5.

Thus, the flexibility afforded by the concept of this invention serves to provide dramatic improvement in the most significant operational and environmental aspects of internal combustion engines, the solutions to which might otherwise appear incompatible. The effects of both excessive and insufficient vapor pressure are diminished or completely eliminated by these systems without otherwise affecting engine operation.

I claim:

1. The method of operating an internal combustion engine employing a vaporizable liquid full range fuel mixture of constituents having different boiling points including the steps of separating at least a portion of said fuel into at least two fractions including a higher boiling fraction and a lower boiling fraction and operating said engine at least in part on said lighter boiling fraction at least when the operating temperature or said engine is below a predetermined minimum, and further operating said engine at least in part on said heavy fraction accumulated during at least a portion of the time said engine operates, said heavy fraction being supplied to said engine through a liquid fuel pump when the temperature in said liquid fuel pump exceeds a predetermined maximum.

2. The method of reducing emissions of noxious gases from an internal combustion engine operating on a full range hydrocarbon fuel having a boiling point range of at least about 100° F. while maintaining the desired performance level of said engine without substantial variation in air-fuel ratio as a function of engine operating temperature which comprises; separating at least a portion of said fuel during at least a portion of the operation of said engine into a lower boiling fraction and a higher boiling fraction, accumulating at least a portion of said lower boiling fraction, introducing said lower boiling fraction to said engine as at least a portion of the total fuel feed thereto when a first temperature indicative of the operating temperature of said engine is below a predetermined minimum, and maintaining the air-fuel ratio in said engine within about 20% of a predetermined value throughout the range of operating temperatures of said engine at otherwise identical operating conditions.

3. The apparatus comprising in combination an internal combustion engine having fuel induction means for introducing fuel into the combustion zones of said engine, a source of full range liquid engine fuel in fluid communication with the intake of a liquid fuel pump, the discharge of said pump being in fluid communication with said fuel induction means, fuel separation means in fluid communication with said fuel source for separating said full range fuel into a lower boiling fraction and a higher boiling fraction, a first liquid reservoir in fluid communication with said separator for accumulating said lower boiling fraction, said first reservoir being in fluid communication with said fuel induction means through a first valve means for controlling the flow of said lower boiling fraction to said fuel induction means in response to a first temperature indicative of the operating temperature of said engine.

4. The apparatus of claim 3 wherein said first reservoir is in fluid communication with the intake of said fuel pump, said apparatus further comprises a second valve means for controlling the flow of said full range fuel to said fuel pump intake in response to said first temperature, and said first valve means comprises means for controlling the flow of said lower boiling fraction to said fuel pump intake in response to the differential between said first temperature and a predetermined temperature.

5. The apparatus of claim 4 further comprising a second fluid reservoir in fluid communication with said separator for accumulating said higher boiling fraction, said second reservoir being in fluid communication with said fuel pump intake, second temperature sensing means for detecting a second temperature indicative of the fuel temperature in said pump, and second valve means for controlling the flow of said full range fuel to said fuel pump intake in response to at least one of said first and second temperatures.

6. The apparatus of claim 5 further comprising a third valve means for controlling the flow of said higher boiling fraction from said second reservoir to the intake of said fuel pump in response to said second temperature indicative of the temperature of said fuel in said fuel pump.

7. The apparatus of claim 3 further comprising a second valve means for controlling the flow of said full range fuel to the intake of said fuel pump in response to at least said first temperature and fluid conduit means communicating between said second reservoir and said fuel source for recycling said higher boiling fraction to said fuel source.

8. The apparatus of claim 3 further comprising a first detector in communication with said first reservoir for detecting the amount of said lower boiling fraction in said first reservoir and developing a first signal in response thereto, and a second valve means for controlling the flow of said full range fuel from said source to the intake of said fuel pump in response to at least one of said first temperature and said first signal, said first valve means comprising means for controlling the flow of said lower boiling fraction from said first reservoir to the intake of said fuel pump in response to the deviation of said first temperature from a predetermined temperature.

9. The apparatus of claim 3 further comprising second valve means for controlling flow of said full range fuel to the intake of said fuel pump in response to said first temperature and fourth valve means for controlling the flow of said full range fuel to said separator in response to said first temperature.

10. The apparatus of claim 3 wherein said first valve means comprises means for controlling the flow of said lower boiling fraction from said first reservoir to said fuel induction means in response to the relation of said first temperature to a predetermined minimum temperature and allowing the passage of said lower boiling fraction to said fuel induction means at least when said first temperature is below said predetermined minimum temperature.

11. The apparatus of claim 3 further comprising indirect heat exchange means in heat exchange relationship between said separator and said engine transferring heat from said engine to said separator.

12. The apparatus of claim 3 further comprising means for automatically controlling the air-to-fuel ratio in said engine as a function of said first temperature within a range deviating less than 30 percent from a predetermined value in response to variation in said first temperature at otherwise identical operating conditions.

13. The apparatus of claim 3 further comprising fluid detector means in communication with said first reservoir for detecting the presence of fluid in said reservoir and developing a first signal in response thereto, means for automatically controlling the air-to-fuel ratio in said engine in response to said first temperature within a range deviating less than about 20% from a predetermined ratio in response to variation in said first temperature at otherwise identical conditions, and control means operatively connected with said air-to-fuel ratio control means for controlling said air-to-fuel ratio at least partially in response to at least one of said first signal and said first temperature.

14. In a system for supplying hydrocarbon fuel to an internal combustion engine, the combination comprising:

means for storing a main supply of hydrocarbon fuel,
means for separating volatile fuel components from said hydrocarbon fuel,
means for storing said separated volatile fuel components, and
means for supplying fuel to said engine from said volatile fuel components storing means when said engine is below a predetermined temperature, and for supplying fuel to said engine and to said separating means from said hydrocarbon fuel storing means when the temperature of said engine is at or above said predetermined temperature.

15. In a system for supplying hydrocarbon fuel to an internal combustion engine, the combination comprising: means for storing a supply of hydrocarbon fuel,
means for separating in a vapor phase volatile fuel components from a portion of said hydrocarbon fuel,
means in fluid communication with said separating means for condensing and storing the separated volatile fuel components,
means for supplying fuel to said engine from said condensing and storing means when an engine temperature is below a predetermined value, and for supplying fuel to said engine from said hydrocarbon fuel storing means when said engine temperature is at or above said predetermined value, and
means responsive to a predetermined minimum liquid level in said condensing and storing means for causing said fuel supplying means to supply fuel to said engine only from said hydrocarbon fuel storing means irrespective of said engine temperature.

16. The system of claim 15 further comprising means responsive to a predetermined maximum level of volatile fuel in said condensing and storing means for preventing further separation of volatile fuel components in said separating means.

17. The system of claim 15 wherein said separating means comprises means for heating the portion of hydrocarbon fuel.

18. The system of claim 15 wherein said engine fuel supplying means comprises means for combining fuel from one of said condensing and storing means and said hydrocarbon fuel storing means with air prior to application of the fuel to said engine.

* * * * *

UNITED STATES PATENT AND TRADEMARK OFFICE
CERTIFICATE OF CORRECTION

PATENT NO. : 4,220,120
DATED : September 2, 1980
INVENTOR(S) : Hugh R. Jackson and Robert H. Hass It is certified that error appears in the above–identified patent and that said Letters Patent are hereby corrected as shown below:

On the cover page, the name of inventor "Robert H. Haas" should read -- Robert H. Hass --.

In column 13, line 9, (claim 2) change " ; " to -- : --.

Signed and Sealed this

Twenty-fifth Day of November 1980

[SEAL]

Attest:

SIDNEY A. DIAMOND

Attesting Officer    Commissioner of Patents and Trademarks